(12) United States Patent
Hirose et al.

(10) Patent No.: US 6,779,079 B2
(45) Date of Patent: Aug. 17, 2004

(54) DATA RECORDING AND REPRODUCING APPARATUS, AND METHOD FOR RECORDING AND REPRODUCING DATA WITHOUT TIME CODE DISCONTINUITIES

(75) Inventors: Masaki Hirose, Kanagawa (JP); Jun Yoshikawa, Kanagawa (JP); Satoshi Katsuo, Kanagawa (JP); Gentaro Okayasu, Kanagawa (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 09/876,724

(22) Filed: Jun. 7, 2001

(65) Prior Publication Data

US 2001/0052050 A1 Dec. 13, 2001

(30) Foreign Application Priority Data

Jun. 8, 2000 (JP) .................................... P2000-172602

(51) Int. Cl.$^7$ .............................................. G06F 12/00
(52) U.S. Cl. ......................... 711/112; 711/100; 711/154
(58) Field of Search ................................ 711/112, 100, 711/154; 710/45, 68; 386/46, 125

(56) References Cited

U.S. PATENT DOCUMENTS 6,279,055 B1 * 8/2001 Ito et al. ...................... 710/45
6,411,770 B1 * 6/2002 Ito et al. ...................... 386/46
6,430,159 B1 * 8/2002 Wan et al. .................... 370/246
6,516,134 B1 * 2/2003 Fujita ........................... 386/95
6,577,814 B1 * 6/2003 Ito et al. ..................... 386/125
6,598,101 B1 * 7/2003 Ito et al. ....................... 710/68

* cited by examiner

Primary Examiner—Matthew Kim
Assistant Examiner—Stephen Elmore
(74) Attorney, Agent, or Firm—Frommer Lawrence & Haug LLP; William S. Frommer (57) ABSTRACT

A data recording and reproducing apparatus capable of correctly recording or reproducing data groups by linking divided data within a hard disk is provided. When a group of data such as video and music data are recorded into a hard disk to which random access is possible, file controlling information for indicating a link between the plurality of groups of data is produced from the time code of the groups of data in a time-ordered fashion. Thus-produced file controlling information is then stored in a SRAM of an operation controlling section. When the reproduction position is indicated by the time code, this position is converted into a relative position from the initial position of the file by using the file controlling information. Based on the relative position from the initial position of the file, the data is read out from the hard disk.

36 Claims, 8 Drawing Sheets

DATA RECORDING AND REPRODUCING APPARATUS, AND METHOD FOR RECORDING AND REPRODUCING DATA WITHOUT TIME CODE DISCONTINUITIES

BACKGROUND OF THE INVENTION

1. Field of the Invention

The present invention relates to a data recording and reproducing apparatus, and a method for recording and reproducing data. Specifically, when a plurality of time-ordered data groups are recorded into a recording medium to which random access is possible, link controlling information for indicating a link between the plurality of time-ordered data groups is produced from first time information of the time-ordered data groups. A data group is input data that is grouped together in a specific order with respect to predetermined time codes. Hereinafter, these data groups will be referred to as time-ordered data groups. The first time information merely refers to a time associated with the location or position of the data groups in a memory. When a first position in the plurality of time-ordered data groups is detected by the first time information, the first detected position is linked in a continuous manner by use of the link controlling information to a second detected position that contains the second time information. Then, the recording or reproducing is performed continuously from the first position indicated by the first time information to the second position indicated by the second time information.

2. Description of the Related Art

An apparatus called an Audio/Video (AV) Server is becoming commonplace in broadcasting stations. The AV server has been conventionally used for the purpose of recording, editing, and transmitting video images on a recording medium, such as hard disk, to which random access is possible. The use of an AV server makes it possible, at the time of cue up operation, for example, to directly read the recorded data from any position on the recording medium, without the need for sequentially reading the time codes recorded on a tape and finding out the portion which coincides with the specified time code information, as is the case in a conventional video tape recorder. By using an AV server, an immediate cue up operation is possible, regardless of the position where the cue up operation is performed.

In a conventional AV server, time codes are controlled based on their relative positions from the initial position or location of the file. When video and/or audio data are recorded, the following problem may arise if one file is produced by performing one or more of several processing operations, such as repeating recording, stopping, and recording. That is, time codes become discontinuous within one file because the recording operation is not continuously performed. Such a discontinuity in time codes, however, causes no problem in a video tape recorder for the following reason. In the video tape recorder, the time codes which are recorded on the tape are read to specify the cue up position. Then, desired data can be output in a correct manner, without being influenced by the discontinuity of the time codes.

In contrast, in the AV server, time codes are controlled based on their relative positions from the initial position or location the file. Therefore, if a discontinuity in the time codes has occurred in the AV server, it becomes impossible to read the desired data. If the AV server is constructed in the same manner as the video tape recorder, where the recorded time codes are sequentially read to specify their correct positions, an immediate cue up operation becomes impossible. In this case, the advantage of using the recording medium to which random access is possible is unavailable.

SUMMARY OF THE INVENTION

The object of the present invention is to provide a data recording and reproducing apparatus capable of recording or reproducing data groups by linking divided data correctly within a hard disk, and a method for recording and reproducing such divided data.

In an aspect of the present invention, a data recording and reproducing apparatus includes: an input and output processing device for recording a plurality of time-ordered data groups which have been input into a recording medium to which random access is possible, or for reading from the recording medium the plurality of time-ordered data groups to be output; and a controlling device for producing link controlling information for indicating a link between the plurality of time-ordered data groups from the first time information of the time-ordered data group which has been recorded on the recording medium, and for keeping track of the positions of the plurality of time-ordered data groups by using the link controlling information. When a first position of the plurality of time-ordered data groups is detected by the first time information, the controlling device links the detected first position in a continuous manner to a second detected position indicated by second time information. The input and output processing device performs recording or reproducing of data groups by linking divided data of the first and second detected positions correctly within a hard disk.

In another aspect of the present invention, a data recording and reproducing apparatus includes: an input and output processing device for recording a plurality of time-ordered data groups which have been input into a recording medium to which random access is possible, or for reading out from the recording medium the plurality of time-ordered data groups to be output within an allocated processing period; and a controlling device for producing link controlling information for indicating a link between the plurality of time-ordered data groups from the first time information of the time-ordered data group which has been recorded on the recording medium, and for keeping track of the positions of the plurality of time-ordered data groups by using the link controlling information. When a first position of the plurality of time-ordered data groups is detected by the first time information, the controlling device, by using the link controlling information, detects a second position which is linked in a continuous manner to the first detected position by the second time information.

When a new position is detected, the controlling device detects a next position which is indicated by the second time information and corresponds to the new position detected by the first time information. The input and output processing device performs recording or reproducing of data groups by linking divided data of the first and second detected positions correctly within a hard disk.

In still another aspect of the present invention, a method for recording and reproducing data includes the steps of: when a plurality of time-ordered data groups are recorded onto a recording medium to which random access is possible, producing link controlling information for indicating a link between the plurality of time-ordered data groups from the first time information of the time-ordered data group; when a first position in the plurality of data groups is detected by the first time information, by using the link controlling information, the detected position is linked in a continuous manner to a second detected position by the second time information.

In still another aspect of the present invention, a method for recording and reproducing data includes the steps of: when a plurality of time-ordered data groups is recorded onto a recording medium to which random access is possible within an allocated processing period, producing link controlling information for indicating a link between the plurality of time-ordered data groups from the first time information of the time-ordered data group; when a first position in the plurality of data groups is detected by the first time information, by using the link controlling information, the detected position is linked in a continuous manner to a second detected position by the second time information and corresponds to the position which has been newly detected by the first time information, based on the current position; and the second detected position detected by the second time information.

In still another aspect of the present invention, in the data recording and reproducing apparatus and the method for recording and reproducing data, data is recorded and reproduced within an allocated processing period.

In the present invention, when a plurality of time-ordered data groups such as video and/or music data are recorded on a recording medium such as hard disk to which random access is possible, file controlling information for indicating the link between the plurality of time-ordered data groups is produced from the longitudinal time code and/or vertical interval time code. A longitudinal time code (LTC) is a timing signal that is part of an audio tape recording. It is recorded on a track that runs lengthwise along the tape, which is why it is called longitudinal. The vertical interval time code (VITC) is a timing signal that is part of a video recording. Its is recorded in the vertical blanking intervals between successive frames, hence the "vertical interval."

When the reproduction position is detected by the time code of a time-ordered data group of a first time information, for example, the detected position is linked in a continuous manner by using the link information to a second detected position that contains a second data information.

When the detected position is linked to a relative position from the initial position or location of the file, and a new reproduction position is additionally detected, a relative position is detected within the continuous areas of the longitudinal time code and/or vertical interval time code containing the closest relative position and the current reproduction position based on the current reproduction position. Then, positioning to the detected relative position is performed.

DESCRIPTION OF THE PREFERRED EMBODIMENT

Figure 1:
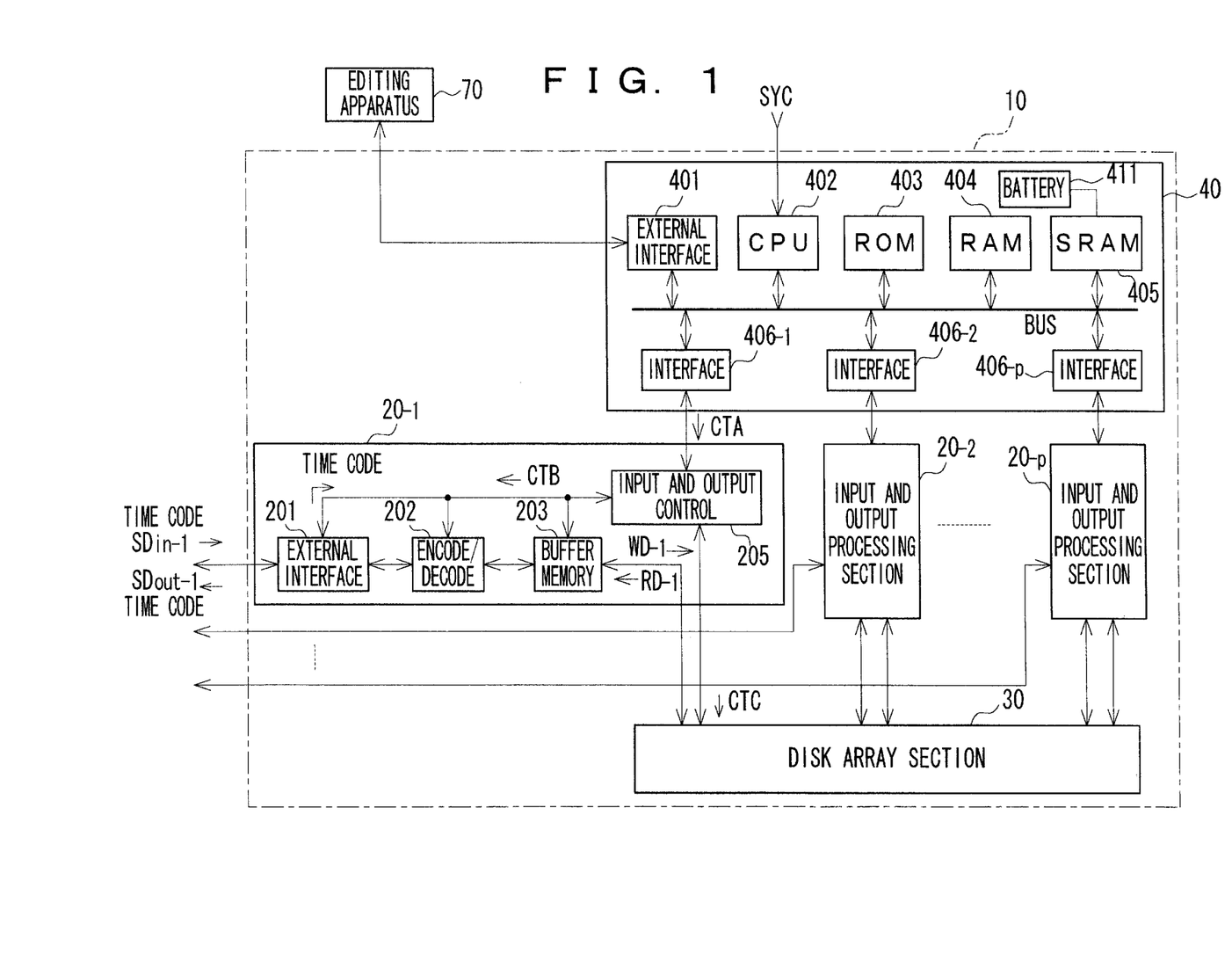
FIG. 1 is a diagram showing a structure of an AV server according to the present invention.

Hereinafter, an embodiment of the present invention will be described with reference to the drawings. FIG. 1 is a diagram showing a structure of a data recording and reproducing apparatus such as an AV server, for example. An AV server 10 is constituted by input and output processing sections 20, a disk array section 30, and an operation controlling section 40.

The AV server 10 includes a plurality of input and output processing sections 20. The plurality of input and output processing sections 20-1, 20-2, . . . , 20-p serve to record time-ordered data groups, which have been input from an external source, into the disk array section 30. In addition, the plurality of input and output processing sections 20-1, 20-2, . . . , 20-p serve to read out the data recorded in the disk array section 30 and output the time-ordered data groups to the outside of the apparatus. For example, the input and output processing section 20-1 encodes a video and/or audio data signal SDin-1 of the material or data which has been input as a time-ordered data group, and records the encoded signal SDin-1 in the disk array section 30. In addition, the input and output processing section 20-1 reads the data recorded in the disk array section 30 and expands it. Then, the input and output processing section 20-1 outputs the expanded data as a video and/or audio data signal SDout-1 (hereinafter, the video and/or audio data signal of the material which is input will be referred to as a "material input data signal", and the video and/or audio data signal of the material which is output will be referred to as a "material output data signal"). Similarly, the remaining input and output processing sections perform the same input and output processings of the material input data signal SDin as those performed by the input and output processing section 20-1. The material input data signal SDin and the material output data signal SDout are transmitted in the serial digital interface (SDI) format which is standardized by the SMPTE259M. The SMPTE 259M is a television standard, written by the Society of Motion Picture and Television Engineers, that describes a serial digital interface (SDI) for 10-bit 4:2:2 component and $4f_{sc}$ composite digital transport.

The input and output processing sections 20-1, 20-2, . . . , 20-p have the same structures as each other. In the following description, only the input and output processing section 20-1 will be described. The input and output processing section 20-1 is constituted by an external interface circuit 201, an encode/decode circuit 202, a buffer memory 203, and an input and output control circuit 205.

The external interface circuit 201 is used to perform data transmission with the outside of the apparatus, and supplies the material input data signal SDin-1 which has been supplied thereto to the encode/decode circuit 202. When the material output data signal SDout-1 is supplied from the encode/decode circuit 202 to the external interface circuit 201, the external interface circuit 201 converts the material output data signal SDout-1 into a predetermined transmission format, and outputs it to the outside of the apparatus. In addition, the external interface circuit 201 supplies a time code which has been supplied thereto to the operation controlling section 40 via the input and output control circuit 205 which will be described later, and also outputs the time code which has been supplied from the operation controlling section 40 via the input and output control circuit 205 to the outside of the apparatus.

The encode/decode circuit 202 compresses the amount of data of the material input data signal SDin-1 which has been supplied thereto to generate a record data signal WD-1 to be recorded in the disk array section 30, and supplies the record data signal WD-1 to the buffer memory 203. In addition, the encode/decode circuit 202 expands a reproduction data signal RD-1 read from the disk array section 30 and stored in the buffer memory 203, and supplies the expanded reproduction data signal RD-1 to the external interface circuit 201 as a material output data signal SDout-1.

The buffer memory 203 temporarily holds the record data signal WD-1 and the reproduction data signal RD-1. The buffer memory 203 is constituted by a plurality of banks. This structure allows the buffer memory 203 to write the recorded data signal WD-1 held in one of its banks into the disk array section 30, and to output the reproduced data signal RD-1 held by another bank. In addition, this structure also allows the buffer memory 203 to read out the reproduced data signal RD-1 from the disk array section 30 to hold it in its one bank, and to hold the recorded data signal WD-1 which is based on the material input data signal SDin-1 in another bank.

The input and output control circuit 205, constituted by a microcomputer, produces a control signal CTB based on an operation control signal CTA supplied from an interface 406 to the input and output processing section in the operation controlling section 40. In addition, the input and output control circuit 205 controls the external interface circuit 201 or the encode/decode circuit 202, and the buffer memory 203 by supplying the control signal CTB to each of these circuits. Furthermore, the input and output control circuit 205 controls the operation of the disk array section 30 by generating a control signal CTC based on the operation control signal CTA, and then supplying the resultant control signal CTC to the disk array section 30.

The disk array section 30 uses a signal recording and reproducing apparatus which uses a recording medium to which random access is possible, for example, redundant arrays of inexpensive disks (RAID) constituted by a plurality of hard disk drives, as is described in "A Case for Redundant Arrays of Inexpensive Disks (RAID)", ACM SIGMOND Conference, Chicago, Ill., Jun. 1–3, 1998, written by Patterson, et al. in 1998. The disk array section 30 writes the record data signal WD-1 based on the control signal CTC supplied from the input and output control circuit 205. In addition, the disk array section 30 reads the recorded data signal WD-1 written therein and outputs the read signal as a reproduced data signal RD-1.

The operation controlling section 40 is constituted by an external interface circuit 401, a central processing unit (CPU) 402, a read only memory (ROM) 403, a random access memory (RAM) 404, a SRAM 405, and an interface 406 for input and output processing. These circuits are connected to each other via a bus 410. To the CPU 402, a synchronization signal SYC such as a reference signal to a broadcasting station is supplied. To the SRAM 405, a battery 411 is connected so that the SRAM 405 can hold the data which it stores, even after the operation of the AV server is finished.

To the external interface circuit 401, an editing apparatus 70 is connected. The external interface circuit 401 serves to receive various input signals from the editing apparatus 70, and to supply the output signal which has been supplied thereto via the bus 410 to the editing apparatus 70. The CPU 402 executes a control program stored in the ROM 403, so as to perform control processing which is synchronous with the synchronization signal SYC supplied thereto. The RAM 404 serves to store the data which is used when the CPU 402 executes the control program. The SRAM 405 serves to store the data which should be held even after the operation of the AV server 10 is finished, and for example, the SRAM 405 stores editing data which has been generated by the editing apparatus 70.

In the AV server 10 structured as described above, the following operation is performed when the AV server 10 receives an input data from the editing apparatus 70 for instructing the AV server 10 to record the material input data. First, the CPU 402 in the operation controlling section 40 controls the input and output processing section 20 to compress the material input data signal SDin, supplied thereto via the external interface circuit 201, in the encode/decode circuit 202. Then, the compressed data is written in one of the banks of the buffer memory 203. After that, the data written in one of the banks of the buffer memory 203 is recorded in the disk array section 30 within the allocated processing period, for example, within the time slot allocated to each of the input and output processing sections among the time slots generated by an time slot generating circuit (not shown). In addition, the CPU 402 obtains information for indicating the position in the disk array section 30 where the data has been recorded from the input and output control circuit 205 of the input and output processing section 20. Based on thus-obtained information, the CPU 402 produces file controlling information for indicating what data in what file is recorded in which position in the disk array section 30. Then, the CPU 402 stores the file controlling information in the SRAM 405.

The editing apparatus 70 selects the required data from the material data recorded in the disk array section 30 to generate editing data. Then, the editing apparatus 70 supplies the editing data to the operation controlling section 40 in the AV server 10.

When the editing data is supplied to the operation controlling section 40, the CPU 402 in the operation controlling section 40 produces record link information used for reading the material data shown by the editing data from the disk array section 30, based on the editing data and the file controlling information. Then, the CPU 402 stores the resultant record link information into the SRAM 405.

In this case, if the editing apparatus 70 instructs the operation controlling section 40 to read the file which has been edited, the CPU 402 reads the record link information of the detected file from the SRAM 405. Then, based on this record link information, the CPU 402 produces an operation control signal CTA, and supplies it to the input and output processing section 20. The input and output processing section 20 produces control signals CTB and CTC based on the operation control signal CTA. Then, the input and output processing section 20 supplies the control signals CTB and CTC to each of the circuits in the input and output processing section 20, and the disk array section 30. As a result, the input and output processing section 20 reads desired data from the disk array section 30 within the allocated time slot, and writes it into one of the banks of the buffer memory 203. At the same time, the input and output processing section 20 reads the data written in one of the banks of the buffer memory 203 and supplies it to the encode/decode circuit 202. These processings are repeated until the reading of the data of the desired file is completed. In addition, the material output data signal SDout obtained as a result of decoding in the encode/decode circuit 202 is output via the external interface circuit 201, so that the material data of the file to which instruction for reading has been provided can be output.

Figure 2:
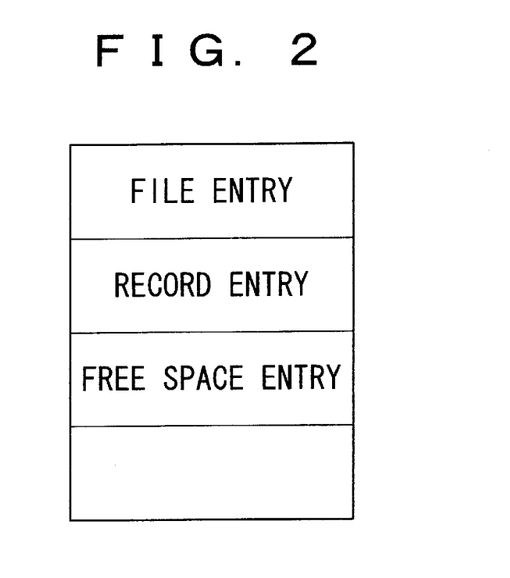
FIG. 2 is a diagram showing a structure of file controlling information.

Next, a structure of the file controlling information stored in the SRAM 405 will be described. The file controlling information is produced as a list in the form of a so-called linked list (record entry). FIG. 2 is a diagram showing file controlling information in the SRAM 405. The file controlling information is constituted by a file entry for controlling information specific to each of the files, a record entry for controlling an actual position where data is recorded in the disk array section 30, and a free space entry for controlling an empty area in the disk array section 30. A plurality of the file entries and a plurality of the record entries may be controlled in the SRAM 405.

Figure 3A:
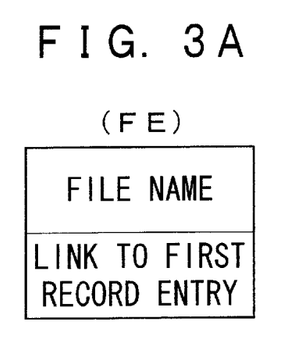
FIGS. 3A to 3C are diagrams each showing a structure of an entry of the file controlling information.

As shown in FIG. 3A, the file entry FE has a "file name" for indicating the name specific to each of the files, and a "link to the first record entry" for indicating the link to the first record entry for the desired file name. The desired file name is the file name that a user desires to obtain. Here, the record means a group of data continuously recorded on the recording medium of the disk array section 30.

Figure 3B:
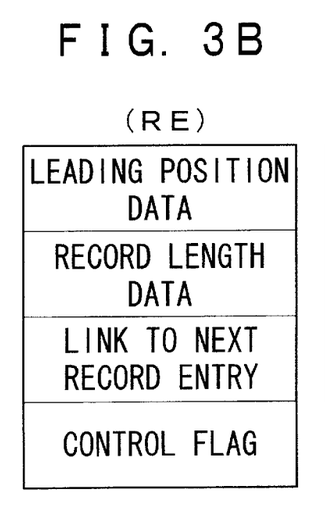

As shown in FIG. 3B, the record entry RE has a "initial position data" for indicating the actual position from which the recording of one record is started in the disk array section 30, a "record length data" for indicating the actual record size of the data of the desired record, and a "link to the next record entry" for indicating the next record entry. Here, the link data of the "link to the next record entry" at an end value (END), means that the desired record entry is the last record entry. The record entry may include, if necessary, a "control flag" for indicating whether or not the data of the desired record may be deleted. For example, the control flag in an ON-state means that the data indicated by the record entry may be deleted. In contrast, the control flag in an OFF-state means that the data indicated by the record entry cannot be deleted. It is also possible to set the control flag to a "MUTE-state" where no reproduction of data is permitted.

Figure 3C:
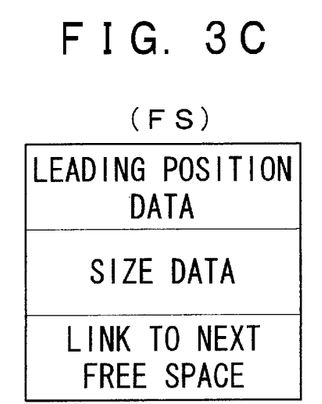

As shown in FIG. 3C, the free space entry FS has "initial position data" for indicating the position from which the desired free space is started, "size data" for indicating the size of the desired free space, and a "link to the next free space" for indicating the free space of the next empty area.

The address of the initial position data and the size of the record length data in the record entry and the free space list may be indicated in units of blocks, for example. The size of each block is set, for example, to the size obtained by multiplying one sector (512 bytes for example) of the hard disk drive by the number of hard disk drives (8 hard disk drives, for example) in the RAID structure in each of which data is recorded (as a result, the size of the block becomes 4 kilobytes, for example).

Figure 4A:
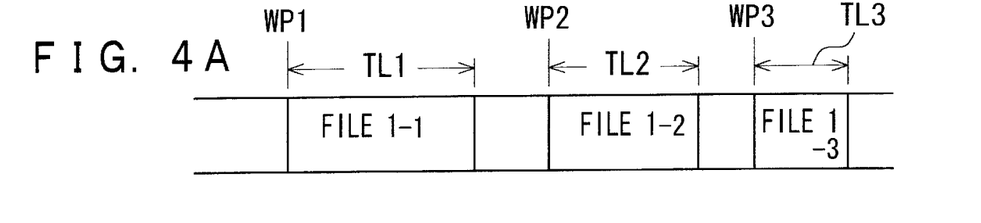
FIGS. 4A and 4B are diagrams for illustrating constructions of a file entry and a record entry, respectively.
Figure 4B:
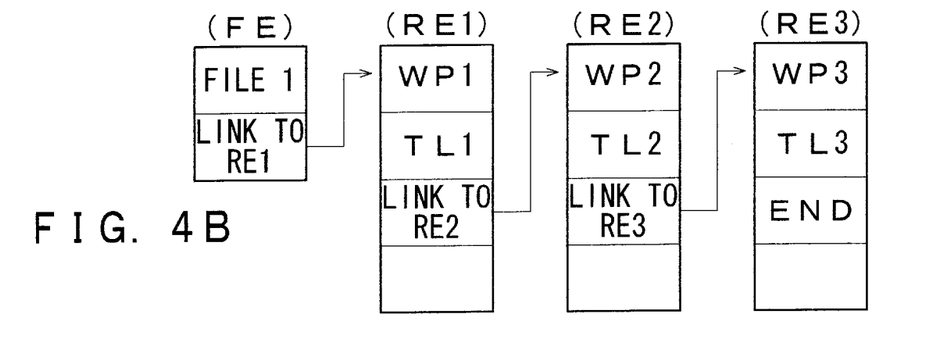

FIGS. 4A and 4B are diagrams showing how the file entry and the record entry are respectively constructed in a file. Hereinafter, description will be made to the case where, for example, as shown in FIG. 4A, the data with the file name of "FILE 1" is divided in three portions and recorded in the disk array section 30.

As shown in FIG. 4B, produced is a file entry FE in which the area of the file name indicates "FILE 1", and the area of the link to the record entry indicates the "link to the first record entry RE1".

In the first record entry RE1, the data with the file name "FILE 1" is continuously recorded starting from the position "WP1" into the record size "TL1". Therefore, the "initial position data" is set to "WP1", and the "record length data" is set to "TL1". Since the data with the file name "FILE 1" is not all stored in the record entry RE1, a record entry RE2 is produced. In addition, a "link to the record entry RE2" is set to the area of the "link to the next record entry" in the record entry RE1.

In the record entry RE2, subsequent to the data indicated by the record entry RE1, the data with the file name "FILE 1" is continuously recorded starting from the position "WP2" into the record size "TL2". Therefore, the "initial position data" is set to "WP2", and the "record length data" is set to "TL2". Since the data with the file name "FILE 1" all stored in the record entry RE2, a record entry RE3 is produced. In addition, a "link to the record entry RE3" is set to the area of the "link to the next record entry" in the record entry RE2.

In the record entry RE3, subsequent to the data indicated by the record entry RE2, the data with the file name "FILE 1" is continuously recorded starting from the position "WP3" into the record size "TL3". Therefore, the "initial position data" is set to "WP3", and the "record length data" is set to "TL3". Since the data with the file name "FILE 1" is all stored in the record entry RE3, an "end value (END)" is set to the area of the "link to the next record entry" in the record entry RE3. In the manner as described above, the file entry FE indicating the position where the data with the file name "FILE 1" is recorded, and the record entries RE1, RE2, and RE3 can be constructed. When the data with the file name "FILE 1" is read, the first record entry is identified from the file entry with the file name "FILE 1". In addition, the data is read out from the disk array section 30 based on the "initial position data" and the "record length data" of the first record entry and the next record entries and thereafter sequentially links one after another. With this arrangement, the data with the file name "FILE 1" can be correctly read, even if the positions where the data with the file name "FILE 1" are recorded are discontinuous.

Figure 5A:
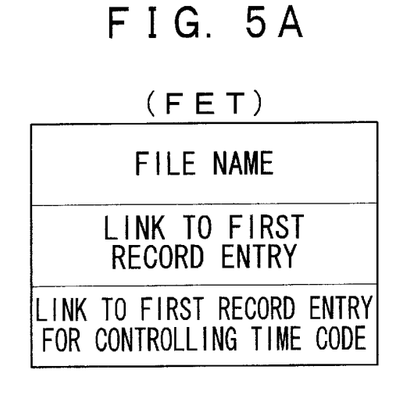
FIGS. 5A and 5B are diagrams showing time code controlling information.
Figure 5B:
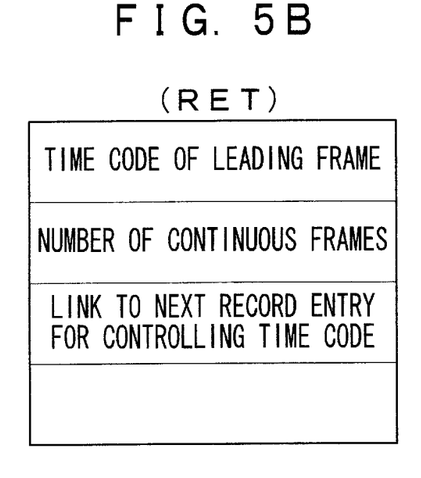

Furthermore, the AV server 10 produces time code controlling information. The time code controlling information is link controlling information which makes it possible to identify the link between data, even if not only the positions where data are recorded are discontinuous, but also time codes of the first time information are discontinuous. FIGS. 5A and 5B are diagrams showing time code controlling information. FIG. 5A shows a structure of the file entry FET provided with information for enabling continuous reproduction, even if the time codes are discontinuous. As is the case of the file entry FE, the file entry FET is provided with an area of the file name and an area of the link to the record entry. In addition to these areas, the file entry FET is also additionally provided with an area of the link to the controlling information for enabling continuous reproduction even if the time codes are discontinuous (hereinafter, this controlling information is referred to as a "record entry for controlling time code").

FIG. 5B shows a structure of the record entry RET for controlling the time codes. Hereinafter, description will be made on the assumption that a longitudinal time code (LTC) is used as a time code. A longitudinal time code (LTC) is a timing signal that is part of an audio tape recording. It is recorded on a track that runs lengthwise along the tape, which is why it is called longitudinal. Alternative to the longitudinal time code, it is also possible as a time code to use a vertical interval time code (VITC) which is inserted into a specific line in a vertical blanking period. The vertical interval time code (VITC) is a timing signal that is part of a video recording. Its is recorded in the vertical blanking intervals between successive frames, hence the "vertical interval."

A first record entry RET for controlling time code is constituted by a "initial frame time code" for indicating the time code of this record entry, a "continuous frame number" for indicating the number of the continued frames, and a "link to the next record entry" for indicating the link to the next record entry for controlling time code. In the record entry RET for controlling the time code which is sequentially linked to the first record entry RET for controlling the time code, and the "initial frame time code" shows the number of frames counted from the initial frame time code which is indicated by the first record entry for controlling the time code. In other words, the relative position from the first frame is shown as second time information.

Next, the procedure of producing the time code controlling information described above will be described, with reference to the flow chart of FIG. 6. When data is recorded in the disk array section 30, the CPU 402 performs the processing shown in the flow chart of FIG. 6 to automatically produce the time code controlling information. Thus-produced time code controlling information is stored in the SRAM 405.

When the recording of data is started, in Step ST1, the position of the first record entry RET for controlling the time code is determined. In addition, a file entry FET is produced, based on the position and the file name of the first record entry RET for controlling the time code. Furthermore, the first time code is set to the area of the "initial frame time code" in the first record entry RET1 for controlling the time code. Then, the procedure proceeds to Step ST2.

In Step ST2, the continuity of the time code with that of the preceding frame, for example, the continuity of the longitudinal time codes is checked. When it is judged that the time codes are continuous, the procedure returns to Step ST2. In contrast, when it is judged that the time codes are discontinuous, the procedure proceeds to Step ST3.

The longitudinal time code which is input into the AV server 10 usually has a value incremented by "1" compared to the preceding frame. Therefore, only the checking process of Step ST2 is repeated for each of the frames. When the longitudinal time codes are discontinuously input, or the longitudinal time codes become discontinuous because the AV server receives a command to perform recording, then stopping, and to restart recording, and therefore the recording is temporality stopped, then the procedure proceeds from Step ST2 to Step ST3. It is also judged that the longitudinal time codes are discontinuous immediately after the recording is started, because no preceding frame is present. In this case as well, the procedure proceeds to Step ST3.

In Step ST3, identified are the time codes at the time when the discontinuity has occurred, and how many frames from the initial frame the immediately preceding frame is located is also identified. Then, the procedure proceeds to Step ST4.

In Step ST4, the number of frames of the record entry for controlling the time code which is currently processed is calculated in a correct manner, by using the position of the frame immediately before the discontinuity has occurred. Specifically, the following calculation is performed if a record entry for controlling the time code has already been produced before the record entry for controlling the time code, which is currently processed. In this case, the number of all the frames indicated by the record entry for controlling the time code which has been already produced is added up to obtain the cumulative value. Then, the cumulative value is subtracted from the number of frames existing from the initial frame to the frame immediately before the discontinuity has occurred, that is, the relative position. As a result, the number of continuous frames in the record entry for controlling the time code which is currently processed can be obtained in a correct manner. In contrast, when discontinuity is specified immediately after the recording is started, no record entry for controlling the time code is produced before the record entry for controlling the time code which is currently processed. Therefore, the number of continuous frames can be obtained without performing the processing described above. After the number of continuous frames in the record entry for controlling the time code which is currently processed is obtained in the above-described manner, the procedure proceeds to Step ST5.

In Step ST5, a new record entry for controlling the time code is added, and the time code at the point of discontinuity specified in Step ST3 is defined as a "initial frame time code". Then, the procedure proceeds to Step ST6. In this case, the number of continuous frames in the newly added record entry for controlling the time code is still not calculated. Therefore, the number of frames is not defined.

In Step ST6, defined is a link of newly added record entry for controlling the time code to the record entry and for controlling the time code which has been processed before the new record entry is added. Then, the procedure proceeds to Step 7.

In Step ST7, it is checked whether or not the recording has been completed. If the recording is still in progress, the procedure is returned to Step ST2 where the continuity of the time codes is checked again in the next frame. If it is judged in Step ST7 that the recording has been completed, the procedure proceeds to Step ST8.

In Step ST8, the number of continuous frames in the last record entry for controlling the time code is defined in a correct manner. Specifically, the number of all the frames indicated by the record entry for controlling the time code which has been produced before the record entry for controlling the time code which is currently processed are added up to obtain a cumulative value. Then, the cumulative value is subtracted from the number of frames which are actually used for recording. As a result, the number of continuous frames in the record entry for controlling the time code which is currently processed can be obtained in a correct manner. Then, the procedure proceeds to Step ST9.

In Step ST9, an end value (END) is set to the "link to the next record entry" in the last record entry for controlling the time code. Then, the processing is finished.

Figure 6:
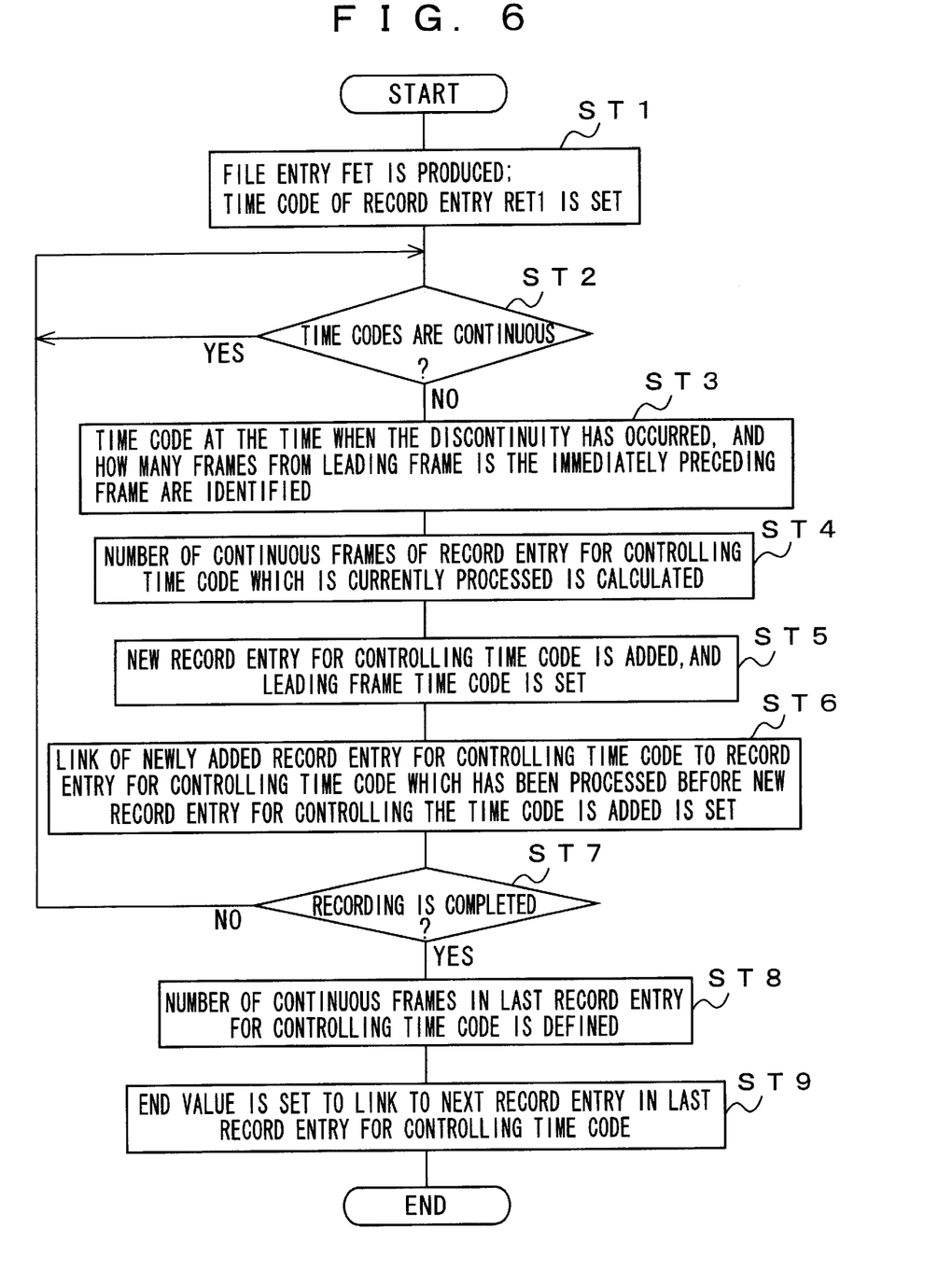
FIG. 6 is a flow chart showing a procedure of producing time code controlling information.
Figure 7A:
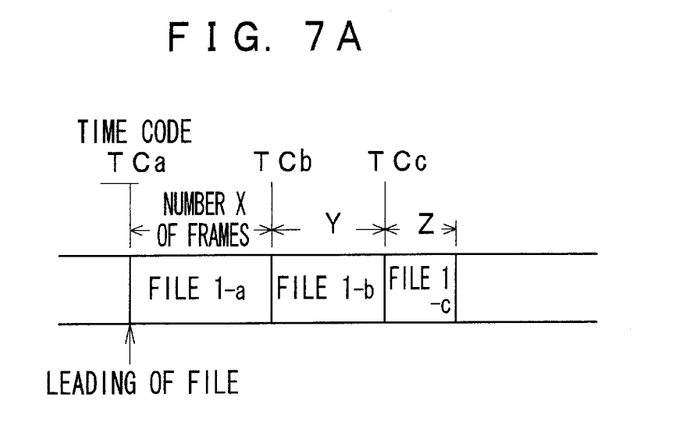
FIGS. 7A and 7B are diagrams for illustrating production of time code controlling information.
Figure 7B:
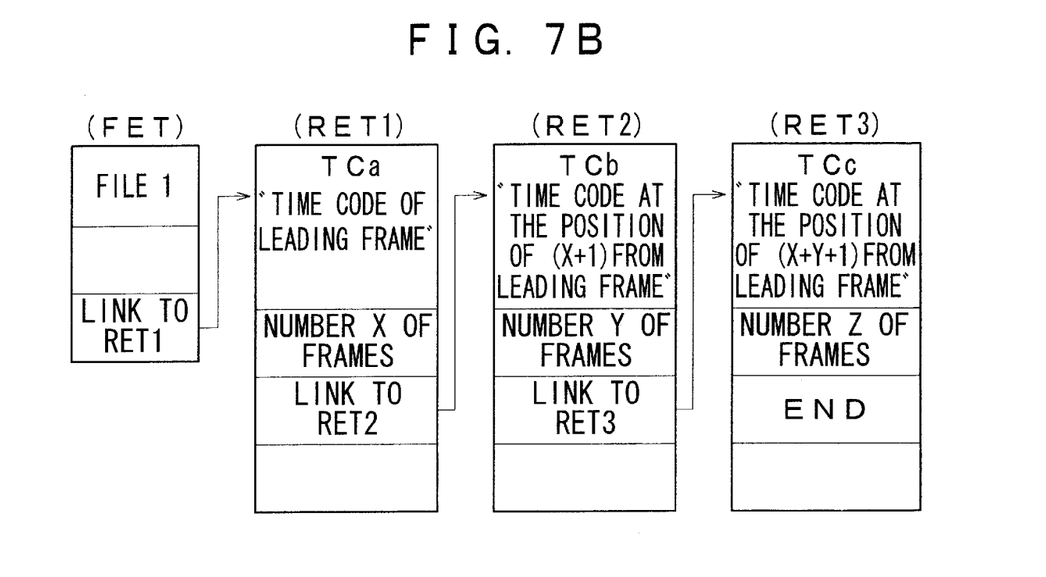

FIGS. 7A and 7B are diagrams showing how the time code controlling information is constructed as a result of the processing shown in FIG. 6, in the state where the time codes are discontinuous at two points.

FIG. 7A shows the data with the file name "FILE 1". In FIG. 7A, frames in the number of X from the time code TCa are continuously used for recording, and then, discontinuity in the time code occurs. After that, frames in the number of Y from the time code TCb are continuously used for recording, and then, discontinuity in the time code has again occurred. Then, frames in the number of Z from the time code TCc are continuously used for recording.

If the processing shown in FIG. 6 is started in this state, as shown in FIG. 7B, a file entry FET is produced. In the file entry FET, "FILE 1" is set to the area of the file name, and a "link to the record entry RET1 for controlling time code" is set to the area of the link to the record entry.

In addition, a time code "TCa" is set to the area of the initial frame time code in the first record entry RET1 for controlling the time code. After that, the continuity of the time codes is checked. If the time code is "TCb" and is judged as being discontinuous, the number of frames counted until the discontinuity is specified, that is, "the number X of the frames" is defined as the number of continuous frames in the record entry RET1 for controlling the time code.

Then, a new record entry RET2 for controlling the time code is provided. In the area of the initial frame time code in the record entry RET2 for controlling the time code, a time code which has been specified as being discontinuous, that is, the time code "TCb" is set.

Since the new record entry RET2 for controlling the time code is produced, a "link to the record entry RET2 for controlling time code" is set to the area linking to the next record entry in the record entry RET1 for controlling the time code.

After that, when the time code becomes "TCc", the time code is judged as being discontinuous again. In this case, the number of frames counted until the discontinuity is specified, that is, the number of frames from the initial frame to the frame immediately before the discontinuity was specified is obtained. Then, the number of continuous frames in the record entry RET1 for controlling the time code is subtracted from the resultant number of frames to obtain "the number Y of frames". The number Y of frames is determined as the number of frames continuous in the record entry RET2 for controlling time code.

After that, a new record entry RET3 for controlling the time code is produced. In the area of the initial frame time code in the record entry RET3 for controlling the time code, a time code specified as being discontinuous, that is, a time code "TCc" is set.

Since the new record entry RET3 for controlling time code is produced, a "link to the record entry RET3 for controlling time code" is set to the area linking to the next record entry in the record entry RET2 for controlling the time code.

When the recording of the data with the file name "FILE 1" is completed, the number of continuous frames in the record entry RET1 for controlling the time code and the number of continuous frames in the record entry RET2 for controlling the time code are subtracted from the total number of frames which are used for recording. As a result, the "number Z of the frames" is obtained. The number Z of the frames is defined as the number of continuous frames in the record entry RET 3 for controlling the time code. In addition, since the recording of the data has been completed, an "end value (END)" is set to the area linking the next record entry in the record entry RET3 for controlling the time code. As a result, the processing of producing the time code controlling information is finished.

Figure 8:
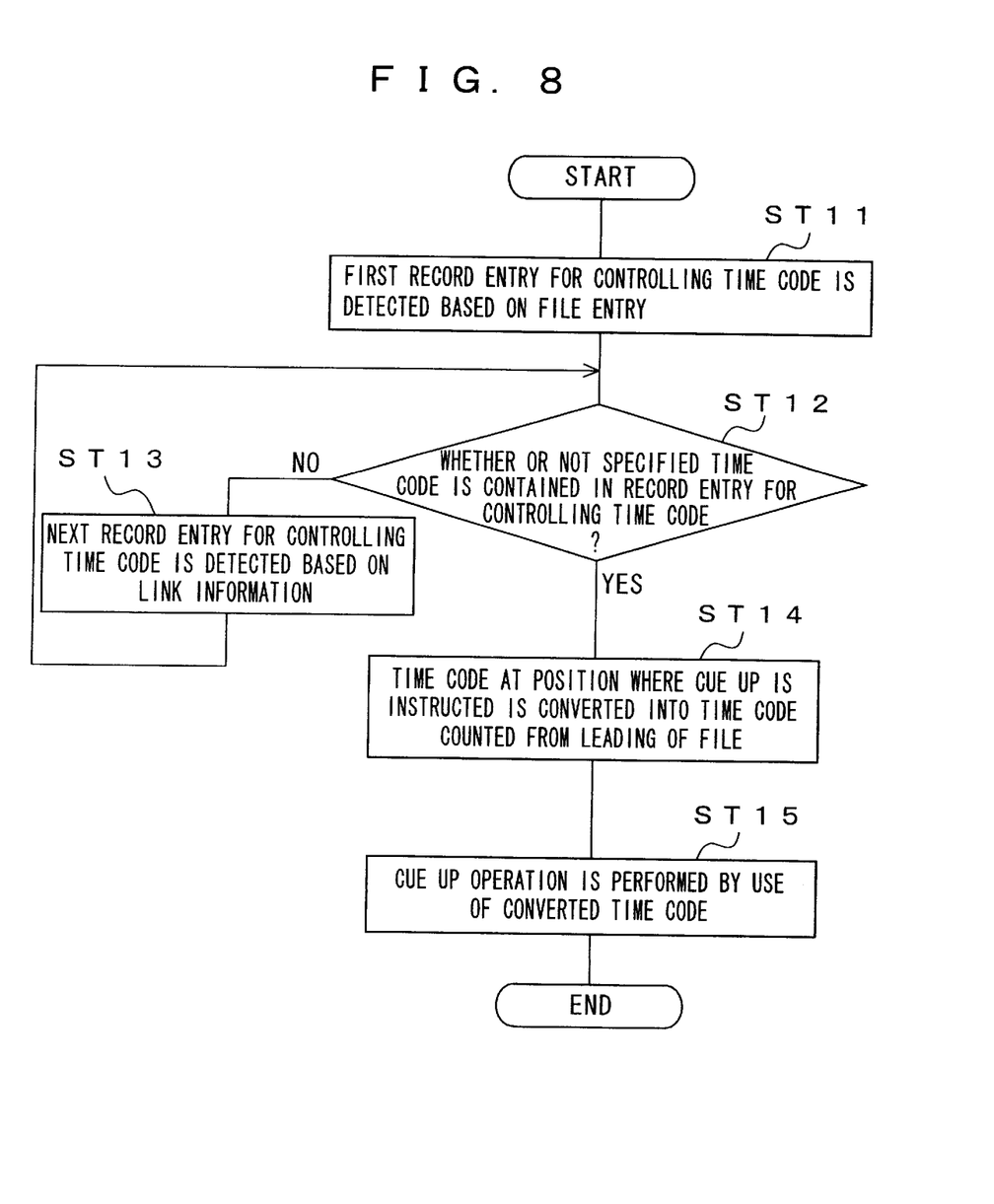
FIG. 8 is a flow chart showing cue-up processing operation.

Hereinafter, cue up processing for the data of the file where discontinuity in the time codes has occurred, by the time code controlling information produced in the manner as described above will be described, with reference to the flow chart of FIG. 8.

In Step ST11, a command for instructing cue up is provided from the editing apparatus 70 by using a time code, for example, a longitudinal time code, to the CPU 402 via the external interface circuit 401. Upon receiving the command, the CPU 402 detects the first record entry RET for controlling the time code, based on the file entry FET with the specified file name. Then, the procedure proceeds to Step ST12.

In Step ST12, it is checked whether or not the specified time code is contained in the record entry RET for controlling the time code. In this case, the procedure proceeds to Step ST13, if no specified time code is contained within the range indicated by the "number of continuous frames" counted from the "initial frame time code" in the record entry RET for controlling the time code. In contrast, the procedure proceeds to Step ST14 if the specified time code is contained within this range.

In Step ST13, the next record entry RET for controlling the time code is detected, by use of the link information of the record entry RET for controlling the time code. Then, the procedure is returned to Step ST12 where it is checked again whether or not the time code is contained in a new record entry RET for controlling the time code.

When it is judged that the time code is contained in the record entry RET for controlling the time code specified in Step ST12, the procedure is proceeded to Step ST14 as described above. In Step ST14, it is counted how many frames from the initial position of the file the frame where the time code is present at the time when the cue up has been detected is located. The counted number is converted into the time code, and the procedure proceeds to Step ST15.

Figure 9:
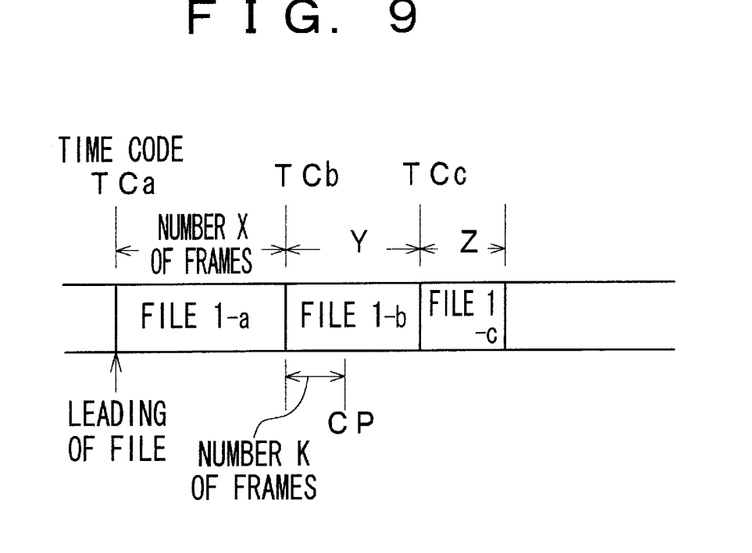
FIG. 9 is a diagram for illustrating a cue-up operation.

For example, as shown in FIG. 9, it is assumed that the position CP where the cue up has been detected is at a position obtained by adding the number K of frames (where $0 \leq K \leq Y$) to the time code "TCb". Since the number of continuous frames in the record entry RET1 for controlling the time code is "X", the time code "TCb" is at a position "X+1" from the initial position of the file. Therefore, the position CP is at a frame "X+1+K" from the initial position of the file.

The AV server has a function of performing cue up by using a relative time code from the initial location of the file, as is the case of conventional AV servers. Therefore, in Step ST15, the positioning of the detected cue up position is performed in a correct manner, by using the time code from the initial location of the file, obtained in Step ST14. Then, the procedure is finished.

In the embodiment described above, description has been made concerning the time code controlling method wherein a time code of a frame is moved to the next time code of the adjacent frame one by one in a normal operation. In addition to such a normal operation, an operation for high-speed photographing is also performed in the AV server. In the operation for high-speed photographing, the time code is moved only by "one" after an identical frame value is continued N times (for example, in the case of three-times high-speed photographing, N=3). Therefore, the record entry for controlling the time code is provided with an item for moving the information at a high speed. The judgment of continuity in the time code, performed in Step ST2 in FIG. 6, may be switched based on the information moved at a high speed. For example, when the time code is advanced only by "one" by the information moved at a high speed after an identical frame value is continued, the time code controlling information can be produced in the same manner as that described above by performing the judgment of the continuity of the time codes once per N frames.

In the cue up operation, when the judgment in Step ST12 and the time code conversion in Step ST14 are performed, the information (that has been moved at a high speed) of the file entry FET or the record entry RET moved at a high speed for controlling the time code is used. The use of the information moved at a high speed enables a correct cue up operation, even for the data obtained from high-speed photographing where an identical frame value is continued N times.

Figure 10:
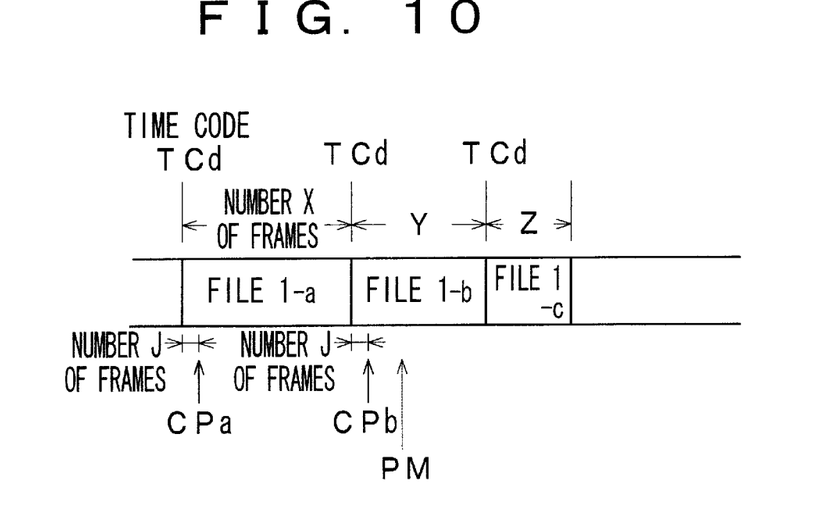
FIG. 10 is a diagram showing an operation (No. 1) performed in the case where a plurality of identical time codes are present.

FIG. 10 shows the case where a plurality of frames with an identical time code TCd are present in one file, and the detection is started from the current reproduction position PM in order to make the operation more similar to the operation of the video tape recorder that has been conventionally used. In this case, the cue up is performed at a position different from the cue up position where the time code is detected starting from the initial location of the file. For example, when the cue up is performed at a position CPb obtained by adding the number J of frames to the second time code TCd, the positioning to the position CPb can be successfully conducted when the detection of the time code is executed starting from the current reproduction position. When the detection of the time code is executed from the initial location of the file, the cue up is performed at a position CPa. In order to perform cue up operation at a position CPb in a correct manner when the detection of the time code is performed starting from the initial location of the file, the following operation is performed. First, when the cue up is executed by the editing apparatus 70, the current reproduction position PM indicated by the relative time code starting from the initial location of the file is added. At the same time, the flow chart shown in FIG. 8 is looped up to the end of the file, without stopping at the point where the first time code coincides. After that, the cue up operation is performed at the point where the time code is closest to the announced relative time code among a plurality of relative time codes, which are finally found from the initial location of the file. As a result, the positioning to the position CPb can be made in a correct manner.

Figure 11A:
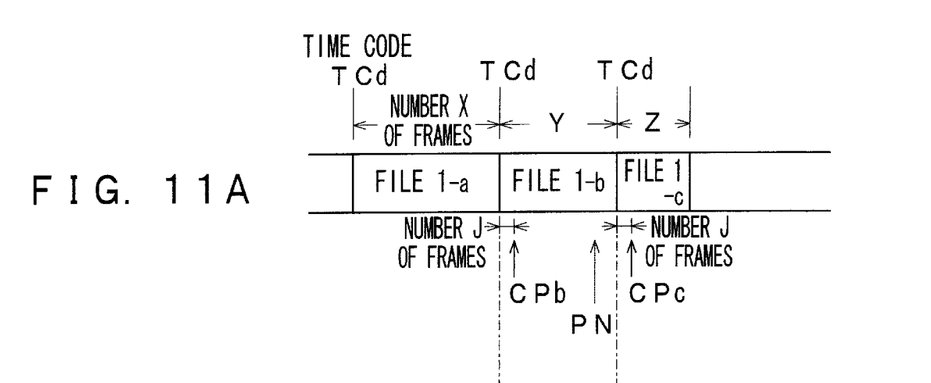
FIGS. 11A and 11B are diagrams showing operations (No. 2) performed in the case where a plurality of identical time codes are present.
Figure 11B:
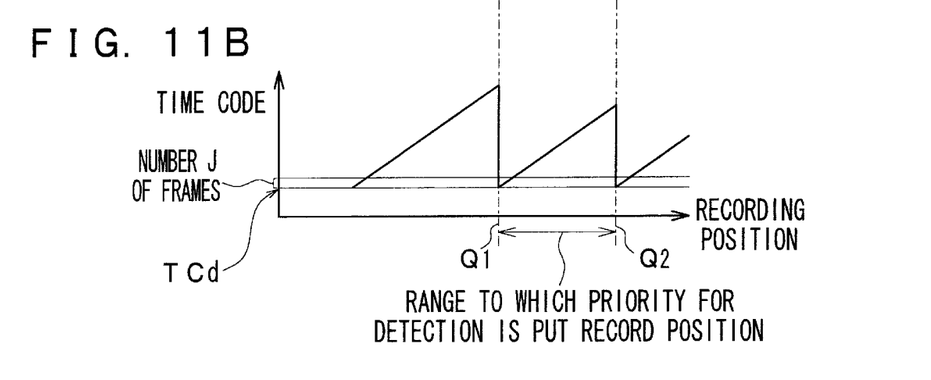

When there is a plurality of frames with an identical time code to each other, the frames may be divided up at positions where the value of the time code is reduced. In this case, the time code may be detected in the area where the reproduction position is contained. For example, as shown in FIG. 11A, when there are three frames with an identical time code to each other, there are at least two positions (positions Q1 and Q2) where the value of the time code is reduced, and therefore, three or more areas are created as shown in FIG. 11B. In this state, when the time code at the cue up position is detected, the detection is performed by putting a priority to the area containing the reproduction position PN. The position where the time code coincides in this area is determined as a cue up position. In this case, the data for one material or data is recorded continuously over a predetermined number of frames. When the data for this material or data is reproduced to set the cue up position, the reproduction position PN shown in FIG. 11A can be positioned to the position CP within the reproduced data for the material in a correct manner. The correct positioning of the position CP can be attained without being cued up to the position CPc, even if the reproduction position PN is distanced from the cue up position CPb, and is close to the position CPc contained in the next record entry for controlling the time slot and having the same time code. The correct positioning is attained not only in the case of cue up operation, but also in the case where the reproduction position is detected by the time code, and new data is recorded starting from the position detected by the time code.

According to the present invention, when the position in a plurality of time-ordered data groups is detected by the first time information, the detected position is linked in a continuous manner by use of the link controlling information to a second detected position that contains the second time information. With this arrangement, even if the first time information in the plurality of time-ordered data groups is not continuous, the positioning of the plurality of the time-ordered data groups can be attained in a correct manner, without the need for reading the time information from the recording medium.

In addition, the link controlling information has information moved at a high speed for indicating the speed at which the first time information has moved. With this arrangement, even if the time it took to move the plurality of the time-ordered data groups is different for each of the plurality of time-ordered data groups, the positioning of the plurality of time-ordered data groups can be attained in a correct manner.

Furthermore, when the position of a first time information is detected, the detected position is linked in a continuous manner by the link controlling information to a second detected position that contains the second time information. With this arrangement, even if the detected position is detected at plural points as positions indicated by the second time information, the positioning to the correct position can be attained.

What is claimed is:

1. A data recording and reproducing apparatus comprising:
   an input and output processing device for recording a plurality of time-ordered data groups which have been input into a recording medium to which random access is possible, or for reading out from the recording medium the plurality of time-ordered data groups to be output; and
   a controlling device for producing link controlling information for indicating a link between the plurality of time-ordered data groups from the first time information of the time-ordered data group which has been recorded on the recording medium, and for keeping track of the positions of the plurality of time-ordered data groups by using the link controlling information,
   wherein, when a first position of the plurality of time-ordered data groups is detected by the first time information, the controlling device links the detected first position in a continuous manner to a second detected position by using second time information, and
   wherein the input and output processing device performs recording or reproducing of said time-ordered data groups by linking the first and second detected positions located in a plurality of locations of said recording medium.

2. The data recording and reproducing apparatus according to claim 1, wherein the controlling device detects a discontinuity in the first time information, and then produces the link controlling information based on the result of the detection of said discontinuity in said first time information.

3. The data recording and reproducing apparatus according to claim 1, wherein the controlling device provides information moved at a high speed for indicating the speed at which the first time information moved in relation to the link controlling information.

4. The data recording and reproducing apparatus according to claim 1, wherein the first time information is a longitudinal time code and/or vertical interval time code.

5. The data recording and reproducing apparatus according to claim 1, wherein the controlling device produces and stores the link controlling information for the plurality of time-ordered data groups in units of files.

6. The data recording and reproducing apparatus according to claim 5, wherein the controlling device uses a relative position from the initial position of the file as a continuous position indicated by the second time information, and wherein the input and output processing device positions the plurality of time-ordered data groups within the file which are indicated by the second time information.

7. A data recording and reproducing apparatus comprising:
an input and output processing device for recording a plurality of time-ordered data groups which have been input into a recording medium to which random access is possible, or for reading out from the recording medium the plurality of time-ordered data groups to be output within an allocated processing period; and
a controlling device for producing link controlling information for indicating a link between the plurality of time-ordered data groups from the first time information of the time-ordered data group which has been recorded on the recording medium, and for keeping track of the positions of the plurality of time-ordered data groups by using the link controlling information,
wherein, when a first position of the plurality of time-ordered data groups is detected by the first time information, the controlling device links the detected first position in a continuous manner to a second detected position by using second time information, and
wherein the input and output processing device performs recording or reproducing of said time-ordered data groups by linking the first and second detected positions located in a plurality of locations of said recording medium.

8. The data recording and reproducing apparatus according to claim 7, wherein the controlling device detects a discontinuity in the first time information, and then produces the link controlling information based on the result of the detection of said discontinuity in said first time information.

9. The data recording and reproducing apparatus according to claim 7, wherein the controlling device provides information moved at a high speed for indicating the speed at which the first time information moved in relation to the link controlling information.

10. The data recording and reproducing apparatus according to claim 7, wherein the first time information is a longitudinal time code and/or vertical interval time code.

11. The data recording and reproducing apparatus according to claim 7, wherein the controlling device produces and stores the link controlling information for the plurality of time-ordered data groups in units of file.

12. The data recording and reproducing apparatus according to claim 11, wherein the controlling device uses a relative position from the initial position of the file as a continuous position indicated by the second time information, and
wherein the input and output processing device positions the plurality of time-ordered data groups within the file which are indicated by the second time information.

13. A method for recording and reproducing data comprising the steps of:
recording a plurality of time-ordered data groups into a recording medium to which random access is possible;
producing link controlling information for indicating a link between the plurality of time-ordered data groups from the first time information of the time-ordered data group;
detecting a first position in the plurality of data groups by the first time information;
linking the detected first position in a continuous manner to a second detected position by using second time information, and
performing recording or reproducing of said time-ordered data groups by linking the first and second detected positions located in a plurality of locations of said recording medium.

14. The method for recording and reproducing data according to claim 13, wherein a discontinuity in the first time information is detected, and the link controlling information is produced based on the result of the detection of said discontinuity in said first time information.

15. The data recording and reproducing apparatus according to claim 13, wherein the link controlling information includes information moved at a high speed for indicating the speed at which of the first time information moved in relation to the link controlling information.

16. The method for recording and reproducing data according to claim 13, wherein the longitudinal time code and/or vertical interval time code is used as the first time information.

17. The method for recording and reproducing data according to claim 13, wherein the link controlling information of the plurality of time-ordered data groups is produced and stored in units of file.

18. The method for recording and reproducing data according to claim 17, wherein the continuous position indicated by the second time information is a relative position from the initial position the file.

19. A method for recording and reproducing data comprising the steps of:
recording a plurality of time-ordered data groups into a recording medium to which random access is possible within an allocated processing period;
producing link controlling information for indicating a link between the plurality of time-ordered data groups from the first time information of the time-ordered data group;
detecting a first position in the plurality of time-ordered data groups by the first time information;
linking the detected first position in a continuous manner to a second detected position by using second time information, and
performing recording or reproducing of said time-ordered data groups by linking the first and second detected positions located in a plurality of locations of said recording medium.

20. The method for recording and reproducing data according to claim 19, wherein a discontinuity in the first time information is detected, and the link controlling information is produced based on the result of the detection of said discontinuity in said first time information.

21. The method for recording and reproducing data according to claim 19, wherein the link controlling information includes information moved at a high speed for indicating the speed at which the first time information moved in relation to the link controlling information.

22. The method for recording and reproducing data according to claim 19, wherein the longitudinal time code and/or vertical interval time code is used as the first time information.

23. The method for recording and reproducing data according to claim 19, wherein the link controlling information of the plurality of time-ordered data groups is produced and stored in units of file.

24. The method for recording and reproducing data according to claim 23, wherein the continuous position indicated by the second time information is a relative position from the initial position the file.

25. A data recording and reproducing apparatus comprising:
- an input and output processing device for recording a plurality of time-ordered data groups which have been input into a recording medium to which random access is possible, or for reading out from the recording medium the plurality of time-ordered data groups to be output; and
- a controlling device for producing link controlling information for indicating a link between the plurality of time-ordered data groups from first the time information of the time-ordered data group which has been recorded on the recording medium, and for keeping track of the positions of the plurality of time-ordered data groups by using the link controlling information,
- wherein, when a first position of the plurality of time-ordered data groups is detected by the first time information, the controlling device links the detected first position in a continuous manner to a second detected position by using second time information, and when a new position is detected, a position indicated by the second time information which corresponds to the newly detected position by the first time information is detected based on a current position, and
- wherein the input and output processing device performs recording or reproducing of said time-ordered data groups by linking the first and second detected positions located in a plurality of locations of said recording medium.

26. The data recording and reproducing apparatus according to claim 25, wherein the controlling device detects the position indicated by the second time information corresponding to the position which is newly indicated by the first time information and is closest to the current position.

27. The data recording and reproducing apparatus according to claim 25, wherein the controlling device detects the position indicated by the second time information corresponding to the position which is newly indicated by the first time information by putting priority on a continuous area of a disk array section including the current position.

28. A data recording and reproducing apparatus comprising:
- an input and output processing device for recording a plurality of time-ordered data groups which have been input into a recording medium to which random access is possible within an allocated processing time, or for reading out from the recording medium the plurality of time-ordered data groups to be output; and
- a controlling device for producing link controlling information for indicating a link between the plurality of time-ordered data groups from the first time information of the time-ordered data group which has been recorded on the recording medium, and for keeping track of the positions of the plurality of time-ordered data groups by using the link controlling information,
- wherein, when a first position of the plurality of time-ordered data groups is detected by the first time information, the controlling device links the detected first position in a continuous manner to a second detected position by using second time information, and when a new position is instructed, a position indicated by the second time information which corresponds to the newly instructed position by the first time information is detected based on a current position, and
- wherein the input and output processing device performs recording or reproducing of said time-ordered data groups by linking the first and second detected positions located in a plurality of locations of said recording medium.

29. The data recording and reproducing apparatus according to claim 28, wherein the controlling device detects the position indicated by the second time information corresponding to the position which is newly indicated by the first time information and is closest to the current position.

30. The data recording and reproducing apparatus according to claim 28, wherein the controlling device detects the position indicated by the second time information corresponding to the position which is newly indicated by the first time information by putting priority on a continuous area of a disk array section including the current position.

31. A method for recording and reproducing data comprising the steps of:
- recording a plurality of time-ordered data groups into a recording medium to which random access is possible;
- producing link controlling information for indicating a link between the plurality of time-ordered data groups from the first time information of the time-ordered data group;
- detecting a first position in the plurality of data groups by the first time information;
- linking the detected first position in a continuous manner to a second detected position by using second time information, and when a new position is instructed, a position indicated by the second time information corresponding to the position which is newly instructed by the first time information based on a current position, and
- performing recording or reproducing of said time-ordered data groups by linking the first and second detected positions located in a plurality of locations of said recording medium.

32. The method for recording and reproducing data according to claim 31, wherein the detection of the position indicated by the second time information is performed by detecting a position indicated by the second time information corresponding to the position which is newly indicated by the first time information and is closest to a current position.

33. The method for recording and reproducing data according to claim 31, wherein the detection of the position indicated by the second time information is performed by detecting a position indicated by the second time information corresponding to the position which is newly indicated by the first time information by putting priority on a continuous area of a disk array section including the current position.

34. A method for recording and reproducing data comprising the steps of:
- recording a plurality of time-ordered data groups into a recording medium to which random access is possible within an allocated processing period;
- producing link controlling information for indicating a link between the plurality of time-ordered data groups from the first time information of the time-ordered data group;
- detecting a first position in the plurality of data groups by the first time information;
- linking the detected first position in a continuous manner to a second detected position by using second time information, and when a new position is instructed, detecting a new position indicated by the second time information and corresponding to the position which has been newly instructed by the first time information, based on a current position, and performing recording or reproducing of said time-ordered data groups by linking the first and second detected positions located in a plurality of locations of said recording medium.

35. The method for recording and reproducing data according to claim 34, wherein the detection of the position indicated by the second time information is performed by detecting a position indicated by the second time information corresponding to the position which is newly indicated by the first time information and is closest to the current position.

36. The method for recording and reproducing data according to claim 34, wherein the detection of the position indicated by the second time information is performed by detecting a position indicated by the second time information corresponding to the position which is newly indicated by the first time information by putting priority on a continuous area of a disk array section including the current position.

* * * * *